US012102257B2

(12) United States Patent
Reiser et al.

(10) Patent No.: US 12,102,257 B2
(45) Date of Patent: Oct. 1, 2024

(54) FOOD PRODUCT DISPENSER WITH REMOVABLE MODULE

(71) Applicant: Rich Products Corporation, Buffalo, NY (US)

(72) Inventors: Ralf Reiser, Orchard Park, NY (US); Shawn Campbell, Burlington (CA); Jeff Kim, Shanghai (CN)

(73) Assignee: Rich Products Corporation, Buffalo, NY (US)

( * ) Notice: Subject to any disclaimer, the term of this patent is extended or adjusted under 35 U.S.C. 154(b) by 844 days.

(21) Appl. No.: 17/195,971

(22) Filed: Mar. 9, 2021

(65) Prior Publication Data
US 2021/0274965 A1 Sep. 9, 2021

Related U.S. Application Data

(63) Continuation of application No. PCT/US2021/020693, filed on Mar. 3, 2021.

(60) Provisional application No. 62/985,142, filed on Mar. 4, 2020.

(51) Int. Cl.
*A47J 31/46* (2006.01)
*A47J 31/50* (2006.01)
*A47J 43/12* (2006.01)

(52) U.S. Cl.
CPC ............. *A47J 31/468* (2018.08); *A47J 31/50* (2013.01); *A47J 43/121* (2013.01); *A47J 43/128* (2013.01)

(58) Field of Classification Search
CPC ........ A47J 31/468; A47J 31/50; A47J 43/121; A47J 43/128
See application file for complete search history.

(56) References Cited

U.S. PATENT DOCUMENTS

| | | | |
|---|---|---|---|
| 1,922,749 A | 8/1933 | Roush | |
| 3,009,606 A | 11/1961 | Zimmermann | |
| 3,203,371 A | 8/1965 | Mosey | |
| 3,219,320 A | 11/1965 | Sutter | |
| 3,559,958 A | 2/1971 | Carpigiani | |
| 3,632,021 A * | 1/1972 | MacManus | A21C 15/005 222/496 |

(Continued)

FOREIGN PATENT DOCUMENTS

CN 207058958 U 3/2018
DE 19718351 A1 11/1998
(Continued)

OTHER PUBLICATIONS

International Search Report with Written Opinion for related Application No. PCT/US2021/029215 dated Jul. 21, 2021 (14 Pages).

(Continued)

*Primary Examiner* — Omar Flores Sanchez
(74) *Attorney, Agent, or Firm* — Michael Best & Friedrich LLP

(57) ABSTRACT

A food product dispenser includes a drive unit and a dispensing unit removably coupled to the drive unit. The dispensing unit includes a product reservoir configured to store the food product, a dispensing nozzle, and a product transfer assembly including a pump assembly configured to be driven by the drive unit when the dispensing unit is coupled to the drive unit to convey the food product from the product reservoir to the dispensing nozzle.

21 Claims, 9 Drawing Sheets

(56) References Cited

U.S. PATENT DOCUMENTS

| | | | |
|---|---|---|---|
| 3,758,080 A * | 9/1973 | MacManus | A01J 13/00 |
| | | | 261/78.2 |
| 3,989,434 A | 11/1976 | Mercer | |
| 4,144,293 A | 3/1979 | Hamoto et al. | |
| 4,168,727 A * | 9/1979 | Yoshida | A23G 3/2069 |
| | | | 141/270 |
| 4,312,596 A | 1/1982 | Maezawa et al. | |
| 4,457,876 A | 7/1984 | Brand | |
| 4,816,190 A | 3/1989 | Kirchler | |
| 5,000,082 A * | 3/1991 | Lassota | A47J 31/56 |
| | | | 99/304 |
| 5,052,593 A | 10/1991 | Grome et al. | |
| 5,089,178 A | 2/1992 | Passoni | |
| D331,365 S | 12/1992 | Davis | |
| D371,941 S | 7/1996 | Kind et al. | |
| 5,804,896 A | 9/1998 | Tkehara et al. | |
| 5,907,993 A * | 6/1999 | Van Camp | A47J 31/4478 |
| | | | 99/305 |
| 6,283,625 B2 | 9/2001 | Frankel et al. | |
| 6,769,801 B1 | 8/2004 | Maurer et al. | |
| D535,851 S | 1/2007 | Vavasseure | |
| 7,422,362 B2 | 9/2008 | Sands | |
| 7,669,517 B2 | 3/2010 | Boussemart et al. | |
| D627,639 S | 11/2010 | Ziegler et al. | |
| 8,172,453 B2 | 5/2012 | Boussemart et al. | |
| D682,607 S | 5/2013 | Garman et al. | |
| 8,469,235 B2 | 6/2013 | Lion | |
| D701,725 S | 4/2014 | Wang | |
| 8,794,485 B2 | 8/2014 | Lunn et al. | |
| 9,332,881 B2 | 5/2016 | Sands | |
| 9,675,943 B2 | 6/2017 | Jialanella et al. | |
| 9,981,232 B2 | 5/2018 | Pappalardo | |
| D823,802 S | 7/2018 | Battistella | |
| D825,616 S | 8/2018 | Monden | |
| D909,419 S | 2/2021 | Nemoto et al. | |
| D923,459 S | 6/2021 | Chan | |
| D937,027 S | 11/2021 | Lee | |
| D940,490 S | 1/2022 | Grob | |
| D941,883 S | 1/2022 | Cooper et al. | |
| D946,522 S | 3/2022 | Norris et al. | |
| D946,523 S | 3/2022 | Simon et al. | |
| 2003/0129293 A1 | 7/2003 | Charles, Jr. | |
| 2005/0082312 A1 * | 4/2005 | Gruenewald | A47J 43/121 |
| | | | 222/399 |
| 2006/0000852 A1 | 1/2006 | Manne | |
| 2010/0193544 A1 * | 8/2010 | Rusch | B67D 1/0007 |
| | | | 222/82 |
| 2010/0221392 A1 * | 9/2010 | Nakai | A47J 43/126 |
| | | | 426/316 |
| 2013/0003494 A1 | 1/2013 | Kirk | |
| 2014/0000302 A1 | 2/2014 | Cocchi et al. | |
| 2014/0322412 A1 | 10/2014 | Buchholz et al. | |
| 2017/0303734 A1 * | 10/2017 | Balkau | A47J 31/4485 |
| 2018/0220837 A1 * | 8/2018 | Midden | A47J 43/121 |
| 2018/0295854 A1 | 10/2018 | Clavier et al. | |
| 2019/0226135 A1 | 7/2019 | Chan | |
| 2020/0109782 A1 | 4/2020 | Odaka | |
| 2021/0274962 A1 * | 9/2021 | Nabeiro | B67D 1/1279 |
| 2021/0274965 A1 | 9/2021 | Reiser | |
| 2021/0353105 A1 | 11/2021 | Campbell et al. | |
| 2022/0322867 A1 * | 10/2022 | Hansen | A47J 31/56 |

FOREIGN PATENT DOCUMENTS

| | | |
|---|---|---|
| EP | 0208927 A1 | 6/1986 |
| EP | 0464341 A1 | 8/1992 |
| EP | 1221883 B1 | 11/2005 |
| EP | 1827188 B1 | 1/2009 |
| EP | 2000067 B1 | 6/2010 |
| EP | 1972241 B1 | 10/2010 |
| EP | 2252186 B1 | 11/2011 |
| EP | 3189887 B1 | 7/2017 |
| JP | 2002176920 A | 6/2002 |
| KR | 3004666170000 | 10/2007 |
| KR | 101254052 B1 | 6/2010 |
| KR | 101269913 B1 | 5/2013 |
| KR | 3009325130000 | 11/2017 |
| TW | D118606 | 8/2007 |
| WO | WO2008047106 A1 | 4/2008 |
| WO | WO2013128708 A1 | 9/2013 |
| WO | WO2017097860 A1 | 6/2017 |
| WO | WO2019090379 A1 | 5/2019 |
| WO | 2021231074 A1 | 11/2021 |

OTHER PUBLICATIONS

International Search Report with Written Opinion for related Application No. PCT/US2021/020693 dated Jul. 1, 2021 (12 Pages).

Mussana, "Cream Whipping Machines", Parts Brochure available at least as early as May 14, 2020 (9 Pages).

Stuart, "ISI Thermo Xpress Whip (1L)" website: https://www.ajstuarts.com/shop/view/3192/isi-thermo-xpress-whip-1-litre, webpage available at least as early as Feb. 28, 2020 (4 Pages).

European Patent Office Extended Search report for Application No. 21765476.3 dated Mar. 4, 2024 (8 pages).

Canadian Patent Office Action for Application No. 3111184 dated Mar. 22, 2024 (5 pages).

* cited by examiner

FOOD PRODUCT DISPENSER WITH REMOVABLE MODULE

CROSS-REFERENCE TO RELATED APPLICATIONS

This application is a continuation of PCT Patent Application No. PCT/US2021/020693, filed Mar. 3, 2021, which claims priority to U.S. Provisional Patent Application No. 62/985,142, filed Mar. 4, 2020, the entire content of each of which is incorporated herein by reference.

BACKGROUND

The present invention relates to food product dispensers, and more particularly to temperature-controlled food product dispensing machines for dispensing consumable food or beverage products, such as whipped topping.

Existing dispensers for whipped product (e.g., whipped cream or other aerated emulsions) include a product reservoir containing a liquid product to be whipped, a whipping assembly (such as a static mixing/aerator rod), and a drive mechanism (such as a motor/pump or a source of pressurized gas) configured to move product from the product reservoir through the whipping assembly to form a whipped product. The whipped product is then dispensed through a nozzle for use.

For food safety reasons, the product reservoir and downstream components that come into contact with the product must be maintained a sufficiently low temperature. Previous dispensers have therefore included internal refrigeration systems for keeping the product and other components cool. These refrigeration systems, however, increase the cost, size, operating noise, and energy consumption of the dispenser.

SUMMARY

In one aspect, the invention provides a food product dispenser including a drive unit and a dispensing unit removably coupled to the drive unit. The dispensing unit includes a product reservoir configured to store the food product, a dispensing nozzle, and a product transfer assembly including a pump assembly configured to be driven by the drive unit when the dispensing unit is coupled to the drive unit to convey the food product from the product reservoir to the dispensing nozzle.

In another aspect, the invention provides a food product dispenser including a drive unit and a dispensing unit removably coupled to the drive unit. The dispensing unit includes a product reservoir configured to store the food product, a dispensing nozzle, and a product transfer assembly configured to be driven by the drive unit when the dispensing unit is coupled to the drive unit to convey the food product from the product reservoir to the dispensing nozzle. The product transfer assembly includes a stationary mixing rod upstream of the dispensing nozzle to aerate the food product before the food product is discharged from the dispensing nozzle.

In another aspect, the invention provides a dispensing system including a drive unit and a plurality of interchangeable dispensing units removably coupled to the drive unit. Each dispensing unit includes a product reservoir configured to store a food product, a dispensing nozzle, and a product transfer assembly configured to be driven by the drive unit when the dispensing unit is coupled to the drive unit to convey the food product from the product reservoir to the dispensing nozzle.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
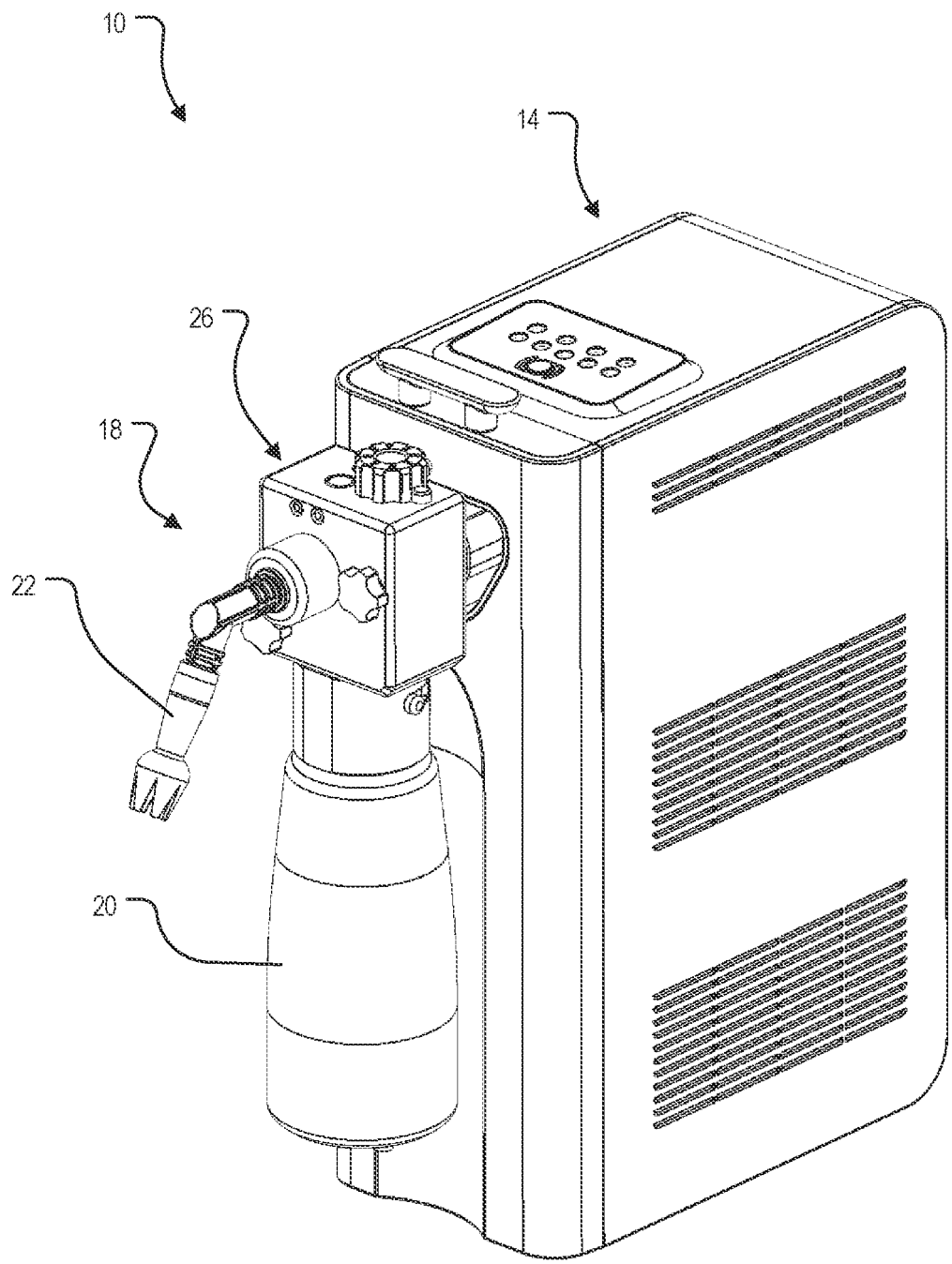
FIG. 1 is a perspective view of a food product dispenser including a drive unit and a dispensing unit according to an embodiment of the present disclosure.

FIG. 1 illustrates a food product dispenser 10 according to one embodiment of the present disclosure. The dispenser 10 includes a drive unit 14 and a dispensing unit or module 18 removably coupled to the drive unit 14. The dispensing unit 18 includes a product reservoir 20 containing a liquid product to be whipped, a dispensing nozzle 22, and a product transfer assembly or whipping assembly 26 configured to be powered by the drive unit 14 to move product from the reservoir 20 to the dispensing nozzle 22.

Figure 2:
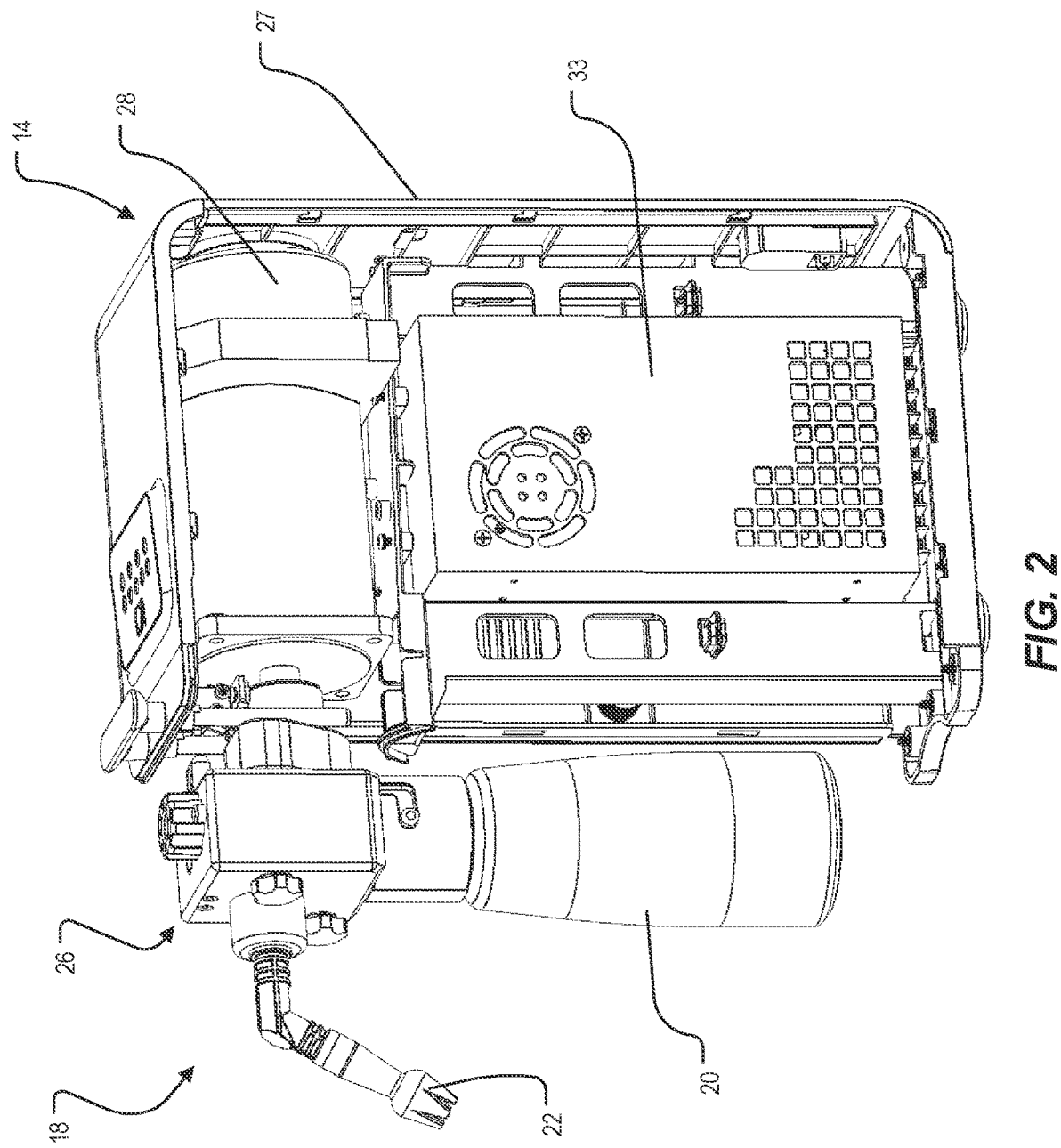
FIG. 2 is a perspective view of the food product dispenser of FIG. 1, with a portion of a housing of the drive unit hidden.
Figure 3:
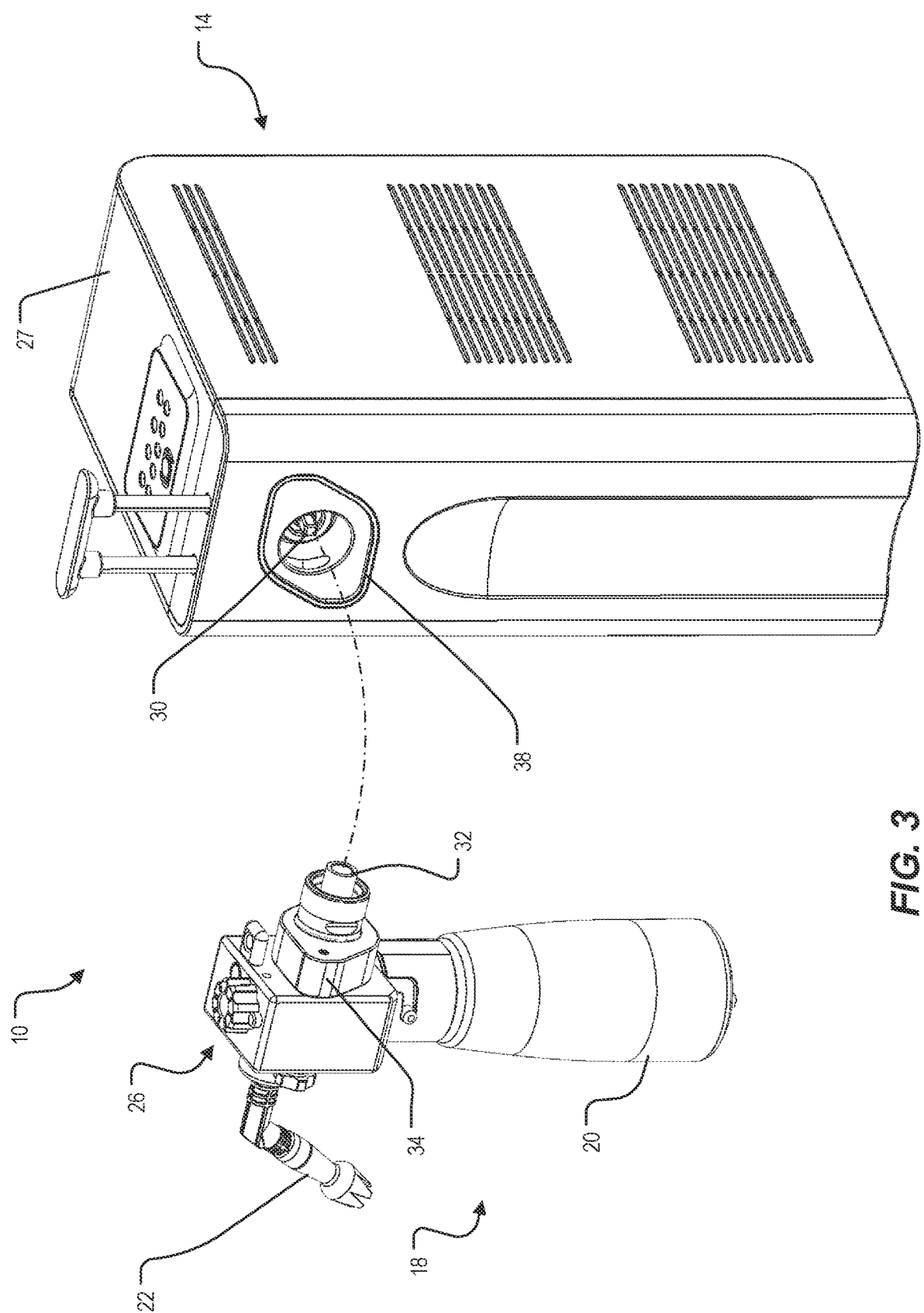
FIG. 3 is a perspective view of the food product dispenser of FIG. 1, illustrating the dispensing unit separated from the drive unit.

Referring to FIGS. 2 and 3, the illustrated drive unit 14 includes a housing 27, a motor 28 (FIG. 2) supported within an upper portion of the housing 27, and a drive shaft 30 (FIG. 3) driven by the motor 28. The drive shaft 30 engages a drive socket 32 on the whipping assembly 26 when the dispensing unit 18 is coupled to the drive unit 14 to provide a rotational input to the whipping assembly 26.

Referring to FIG. 2, the drive unit 14 includes a power supply 33 for providing power to the motor 28. In the illustrated embodiment, the power supply 33 is positioned within the housing 27 below the motor 28; however, the relative positions of the power supply 33 and the motor 28 may vary. The power supply 33 may receive a source of AC power (e.g., from a wall plug) and may include a rectifier to convert AC to DC power to be supplied to the motor 28. In other embodiments, the motor 28 may be an AC motor. In yet other embodiments, the power supply 33 may include a battery to allow for cordless operation of the drive unit 14.

As described in greater detail below, the whipping assembly 26 includes an aerator in fluid communication with the product reservoir 20 and a pump (e.g., a gear pump, wiper pump, or the like) driven by the motor 28 (via the drive shaft 30 and drive socket 32) for drawing the product from the product reservoir and forcing the product through the aerator to form an aerated or "whipped" product. The aerator communicates with the dispensing nozzle 22, which is configured to dispense the whipped product.

In some embodiments, the dispensing unit 18 may include the motor 28. In such embodiments, the drive shaft 30 and drive socket 32 may be replaced by electrical connectors. The power supply 33 of the drive unit 14 may then power the motor 28 in the dispensing unit 18 via the electrical connectors to drive the pump when the drive unit 14 is coupled to the dispensing unit 18.

In other embodiments, the drive unit 14 may include a source of pressurized gas, such as a refillable and/or interchangeable pressurized gas canister, and/or a compressor operable to generate pressurized gas on demand. In such embodiments, the drive shaft 30 and drive socket 32 may be replaced by a pneumatic connector, and preferably a quick-release pneumatic connector such as a bayonet fitting. The drive unit 14 may then supply the pressurized gas to the dispensing unit 18 to force the liquid product from the product reservoir 20 through the aerator (e.g., by pressurizing the product reservoir 20). Alternatively, the pump may include a rotary vane, and the pressurized gas may drive the rotary vane to operate the pump. In yet other embodiments, the pressurized gas may be directed through a venturi, creating suction to draw liquid product from the product reservoir. The liquid product may then be entrained in the flow of pressurized gas and directed through the aerator.

Referring to FIG. 3, the dispensing unit 18 and the drive unit 14 include alignment features 34, 38 (e.g., a non-circular projection 34 on the dispensing unit 18 and a correspondingly shaped recess 38 on the drive unit 14, or vice versa) that cooperate to align the dispensing unit 18 and the drive unit 14. The alignment features 34, 38 facilitate connecting the drive shaft 30, electrical connector, or pneumatic connector (all of which may be referred to as energy transfer connectors) on the drive unit 14 to the dispensing unit 18 to drive the whipping assembly 26. In the illustrated embodiment, the projection 34 and the recess 38 are each generally shaped as parallelograms.

Figure 5:
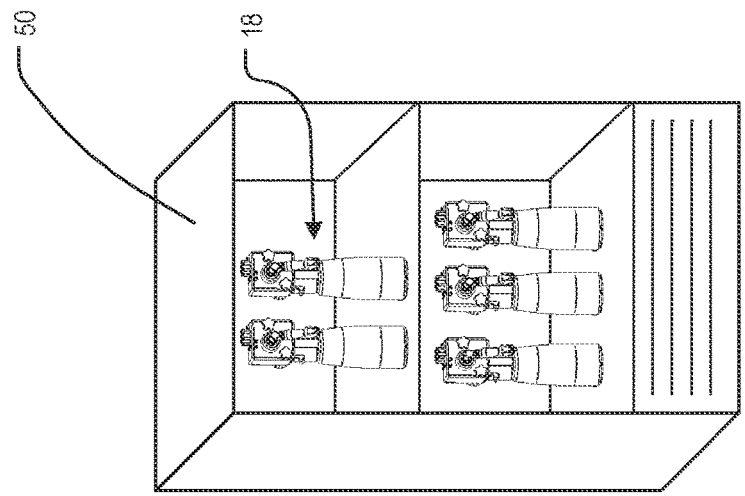
FIG. 5 illustrates a plurality of dispensing units, which may be used in connection with the food product dispenser of FIG. 1, stored in a refrigerator.
Figure 4:
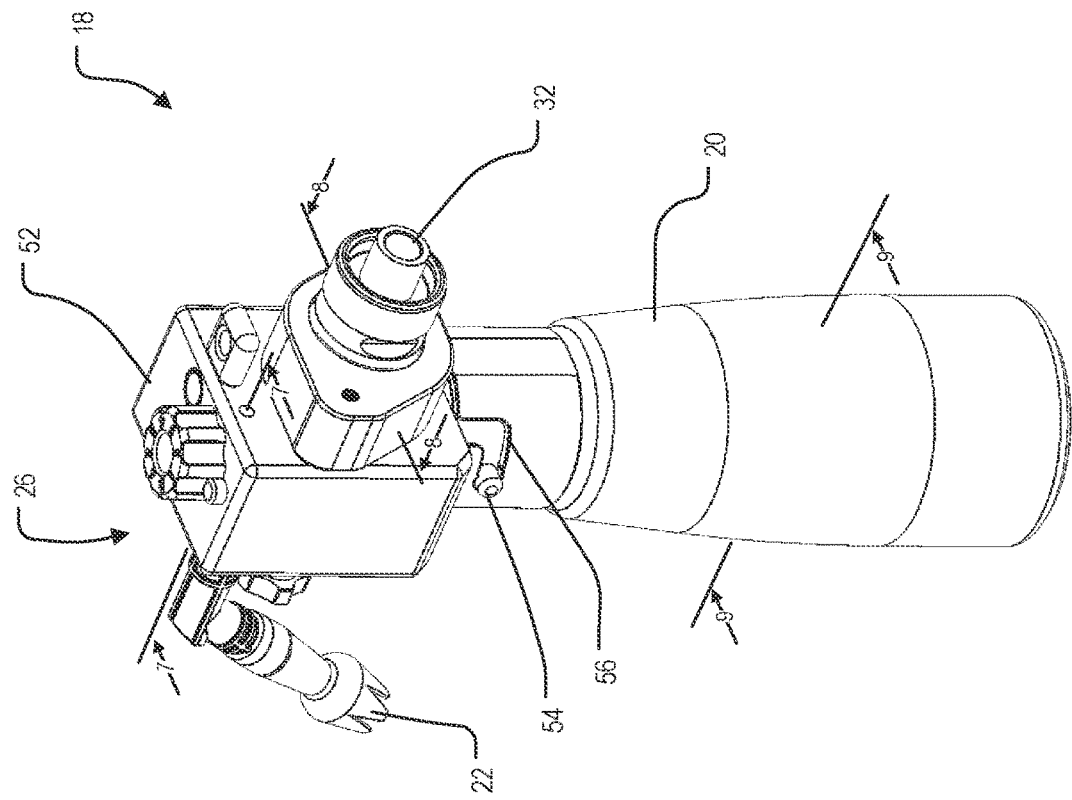
FIG. 4 is a perspective view of the dispensing unit of the food product dispenser of FIG. 1.

Referring to FIGS. 4-5, the dispensing unit 18—which includes the product reservoir 20, whipping assembly 26, and dispensing nozzle 22—can be quickly removed from the drive unit 14 as a single, self-contained assembly. This allows a user to remove the dispensing unit 18 when not in use and store it in a refrigerator 50. The product and all of the downstream components that contact the product can therefore be maintained at safe temperatures without requiring a dedicated refrigeration system. This advantageously reduces the size, cost, complexity, energy requirements, and operating noise of the dispenser 10 as compared to existing dispensers with on-board refrigeration systems.

Figure 6:
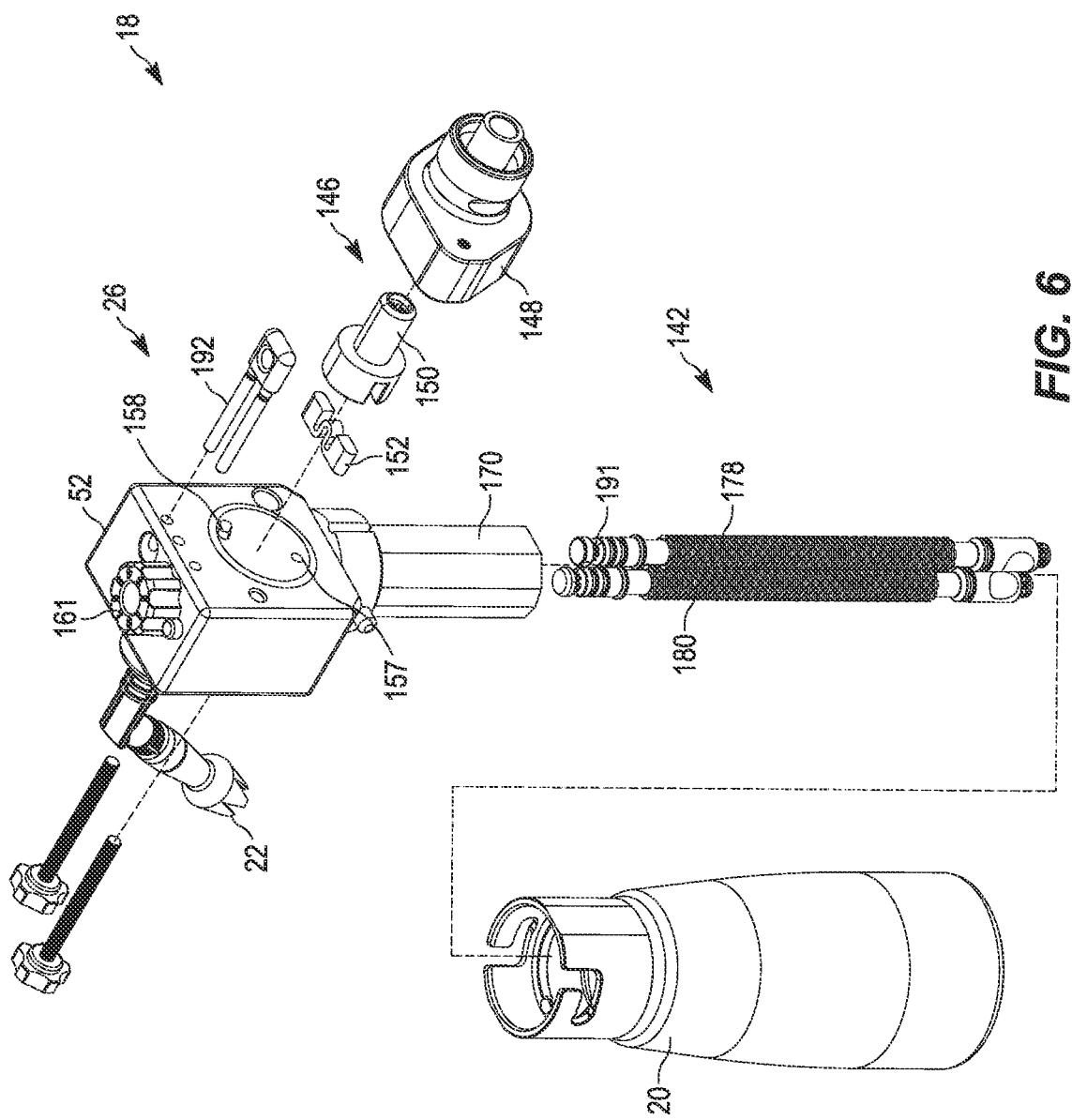
FIG. 6 is an exploded view of the dispensing unit of FIG. 4.

Referring to FIGS. 4-6, the product reservoir 20 of the dispensing unit 18 is preferably insulated in order to keep the product contained therein at a suitably cold temperature for a long period of time when the dispensing unit is outside of the refrigerator 50. For example, the product reservoir 20 may be a double-walled, vacuum-insulated canister. The product reservoir 20 may be made of stainless steel, or any other insulating, food-safe material, including but not limited to a plastic material. In some embodiments, the product reservoir 20 may include a thermally-conductive area in contact with an inner wall of the product reservoir 20 to enhance cooling of the product within the reservoir 20 when the dispensing unit 18 is placed in the refrigerator 50. In such embodiments, an insulating cover may be provided to cover the thermally-conductive area when the product reservoir 20 is removed from the refrigerator 50 for use. In some embodiments, the thermally conductive area may be cooled by ice or a cooling apparatus (such as a thermoelectric cooler) while the dispensing unit 18 is coupled to the drive unit 14.

In some embodiments, the product reservoir 20 may be a disposable product package, such as an aseptic brick package, a plastic or metal foil pouch, or a bag-in-box assembly. Disposable product packaging may facilitate interchanging the type of product to be dispensed by the dispensing unit 18 without having to clean the product reservoir 20. In any such embodiments, the product reservoir 20 may optionally be insertable into an insulating sleeve or casing.

Referring to FIGS. 4 and 6, the whipping assembly 26 includes a housing 52 that is removably coupled to the product reservoir 20. In the illustrated embodiment, the housing 52 includes a projection 54 (e.g., a pin) that is received in an L-shaped slot 56 in the product reservoir 20 to removably couple the housing 52 to the product reservoir 20. The whipping assembly 26 may thus be removed from the product reservoir 20 by rotating the housing 52 relative to the product reservoir 20, which may facilitate cleaning and refilling of the product reservoir 20. In some embodiments, multiple interchangeable product reservoirs 20 may be provided and respectively coupled to the whipping assembly 26. In such embodiments, the product reservoirs 20 may have different sizes and/or volumes. In some embodiments, the housing 52 and product reservoir 20 may be coupled together in other ways (e.g., via a threaded connection).

With continued reference to FIGS. 4 and 6, the dispensing nozzle 22 is removably coupled to the housing 52. To facilitate hygienic storage of the dispensing unit 18, the dispensing unit 18 may include a sanitary cover (not shown) configured to cover the dispensing nozzle 22. The cover may be held in place by a threaded connection, friction (e.g., a press-on connection), a retaining pin or ring, or any other suitable means. The cover may be manually removed by a user prior to using the dispensing unit 18, or in some embodiments, the cover may be automatically removed or moved away from the dispensing nozzle 22 in response to coupling the dispensing unit 18 to the drive unit 14 (FIG. 1). In other embodiments, the dispensing nozzle 22 may include an internal gland made of a resilient material, such as rubber or silicone. In such embodiments, the gland may be retracted into the dispensing nozzle 22 during storage, and the gland may extend from the dispensing nozzle 22 upon activation of the dispensing unit 18 or upon coupling the dispensing unit 18 to the drive unit 14.

In yet other embodiments, the dispensing nozzle 22 may be removed from the position illustrated in FIG. 4 during storage of the dispensing unit 18. In such embodiments, the dispensing nozzle 22 may be inserted into an opening (not shown) in the housing 52 to shield the product contact surfaces of the dispensing nozzle 22 from dirt or other contaminants during storage of the dispensing unit 18. In such embodiments, the opening in the housing 52 may also provide an air inlet passageway into the product reservoir 20. Insertion of the dispensing nozzle 22 into the opening may both shield the dispensing nozzle 22 from contamination and seal the air inlet passageway to preserve the freshness of the product contained within the product reservoir 20.

Referring to FIG. 6-9, the whipping assembly 26 includes an aerator 142 (FIGS. 6 and 9) in fluid communication with the dispensing nozzle 22, an air inlet 144 (FIG. 7), and a pump assembly 146 (FIGS. 6 and 8) operable to draw product from the product reservoir 20 and air through the air inlet 144 and to force a mixture of product and air through the aerator 142. In the illustrated embodiment, an adjustable valve 156 (e.g., a duckbill valve or any other suitable valve) is provided at the air inlet 144 for selectively varying the volume of air that is drawn in through the air inlet 144 during operation of the pump assembly 146 in order to provide a desired consistency for the whipped product discharged through the nozzle 22. The illustrated valve 156 includes a knob 161 disposed on a top side of the housing 52 to facilitate adjustment of the valve 156.

Figure 7:
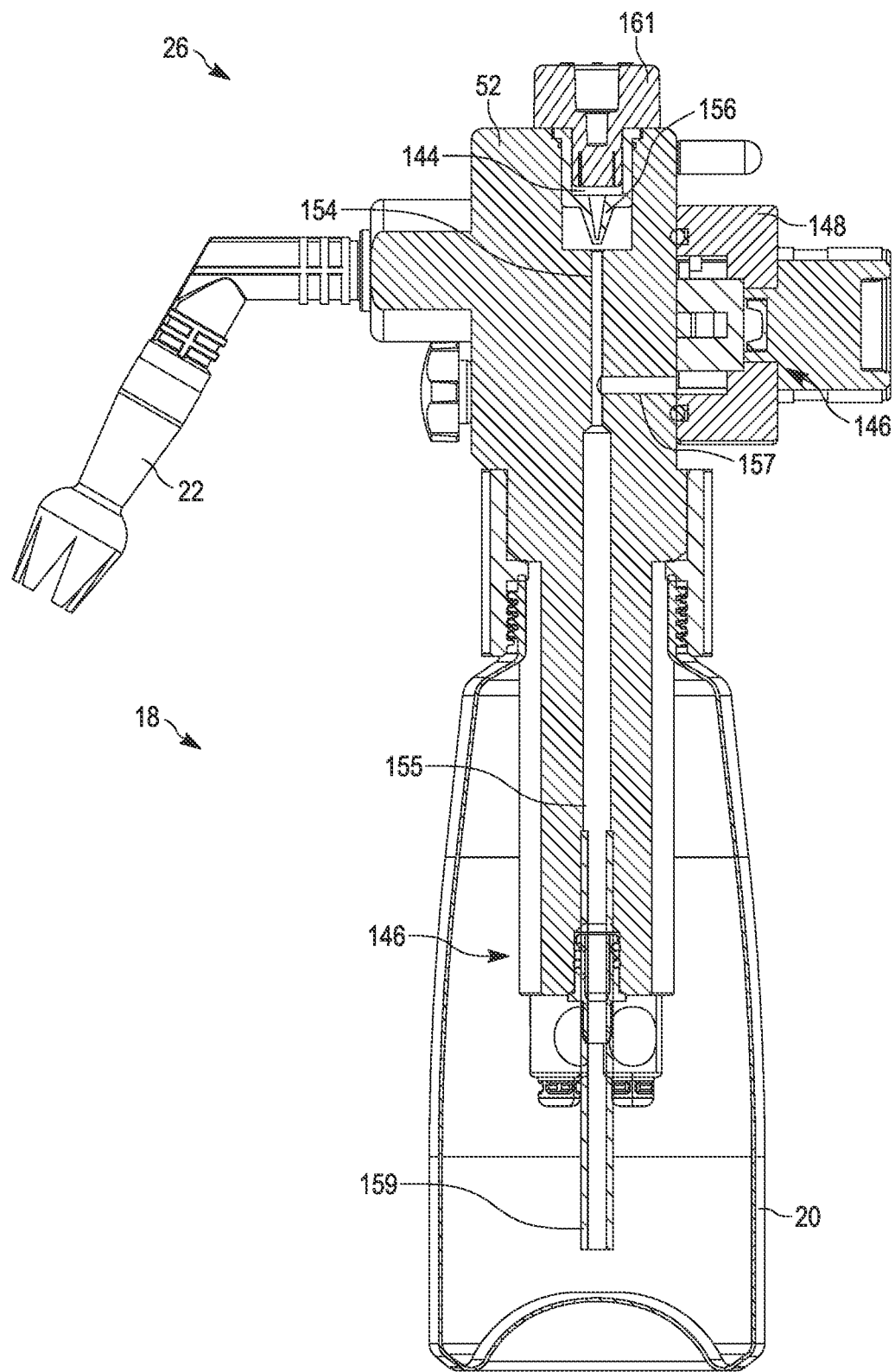
FIG. 7 is a cross-sectional view illustrating an air intake of the dispensing unit, taken along line 7-7 in FIG. 4.

The illustrated pump assembly 146 includes a casing 148, a rotor shaft 150, and a wiper assembly 152 coupled for co-rotation with the rotor shaft 150 within the casing 148. The housing 52 includes a first passageway 154 extending from the air inlet 144 and a second passageway 155 in communication with the product reservoir 20 via a pickup tube 159 (FIG. 7). The first passageway 154 and the second passageway 155 intersect at an inlet passage 157 of the pump assembly 146. A discharge passageway 158 (FIG. 6) of the pump assembly 146 fluidly communicates with the aerator 142.

Figure 8:
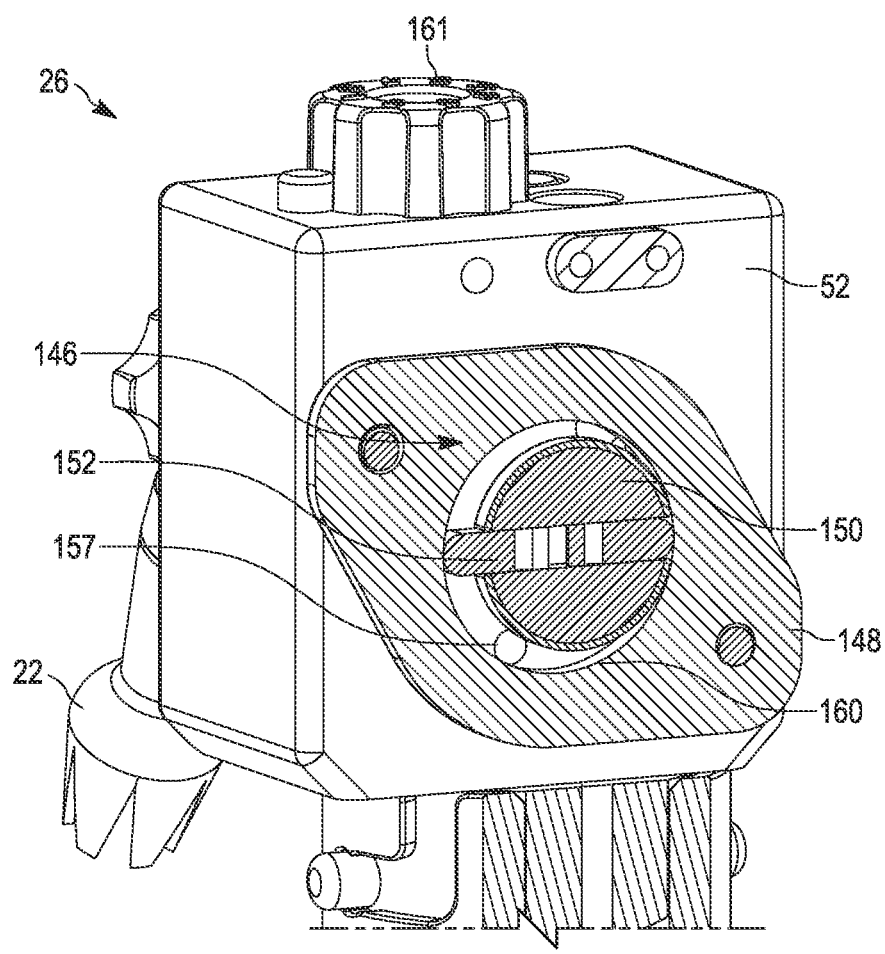
FIG. 8 is a cross-sectional view illustrating a pump of the dispensing unit, taken along line 8-8 in FIG. 4.

Referring to FIG. 8, the casing 148 of the pump assembly 146 includes an eccentric bore 160 in which the wiper assembly 152 is received. When the rotor shaft 150 rotates the wiper assembly 152, air is drawn in through the first passageway 154 and product is drawn in through the second passageway 155 (FIG. 7). The air and product mix at the inlet 157 and are drawn into the casing 148. The mixture is compressed by the rotating wiper assembly 152 and discharged to the aerator 142 through the discharge passageway 158 (FIG. 6).

Figure 9:
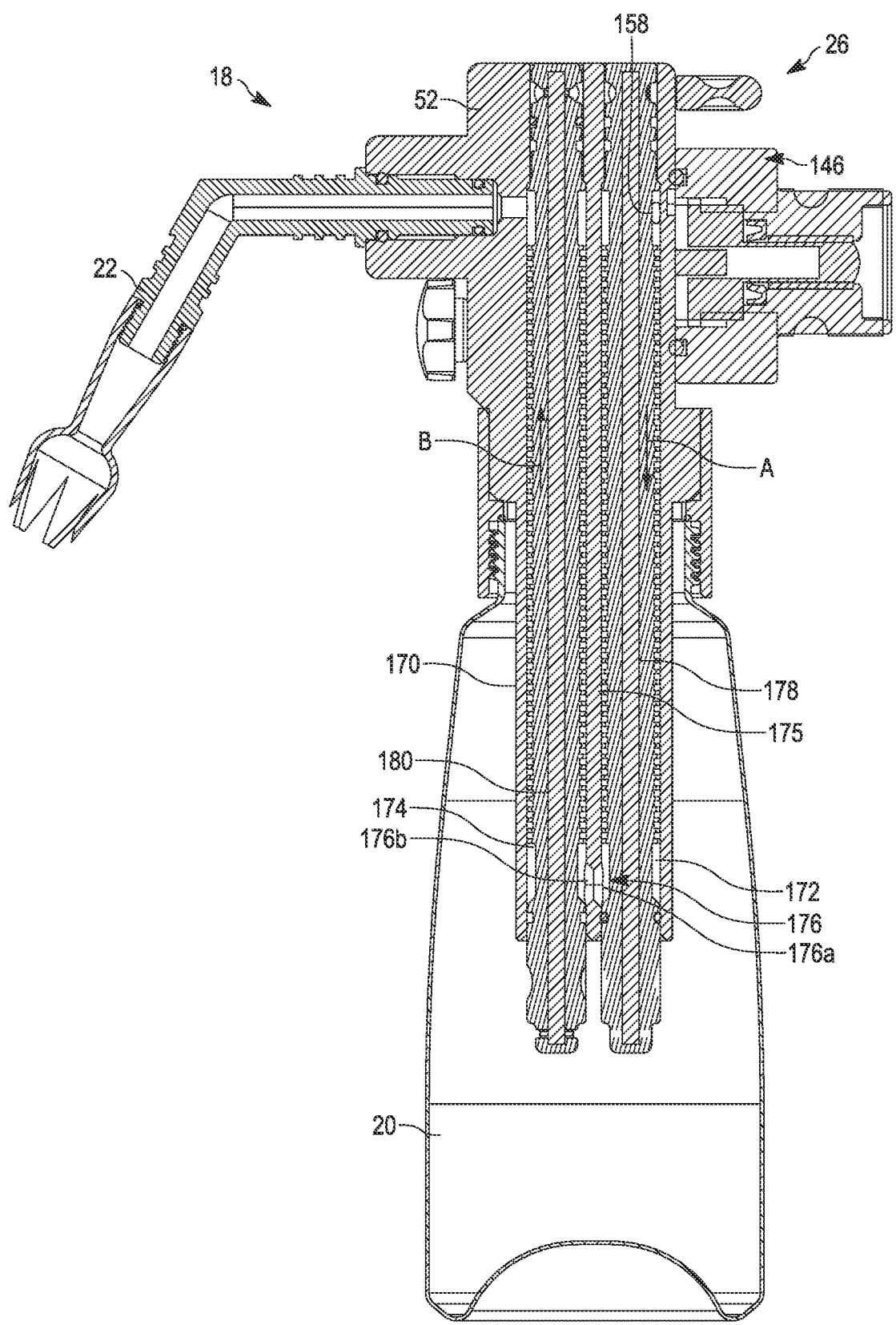
FIG. 9 is a cross-sectional view illustrating a product flow path of the dispensing unit, taken along line 9-9 in FIG. 4.
Figure 10:
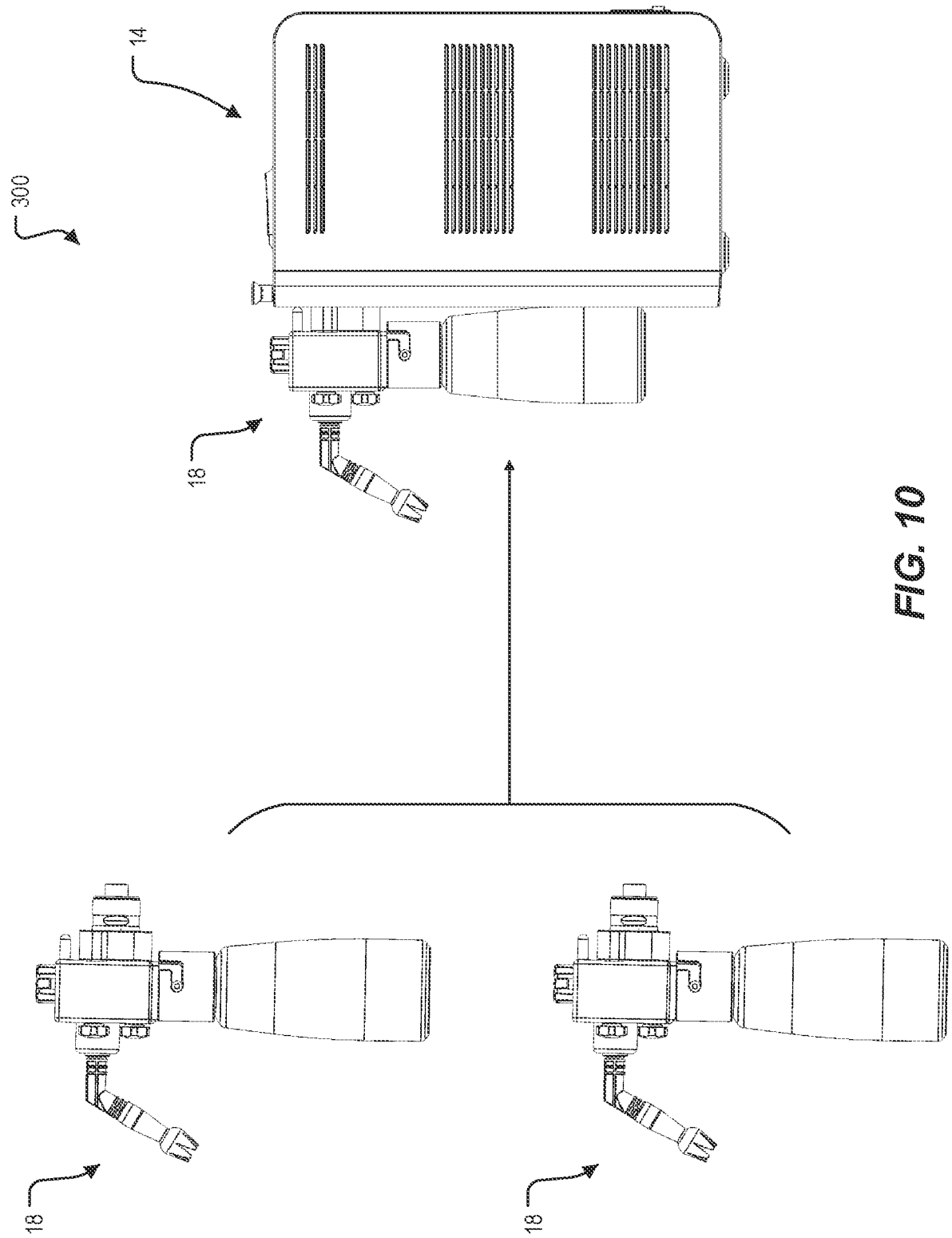
FIG. 10 is a schematic view illustrating a dispensing system according to an embodiment of the present disclosure.

Referring to FIG. 9, the housing 52 of the whipping assembly 26 includes an aerator housing portion 170 extending into the product reservoir 20. The housing portion 170 includes a first chamber 172 and a second chamber 174 separated by a longitudinally-extending dividing wall 175. The second chamber 174 is in fluid communication with the first chamber 172 via a transfer passage 176 extending through the dividing wall 175.

In the illustrated embodiment, the transfer passage 176 includes a first rounded bore 176a and a second rounded bore 176b intersecting the first rounded bore 176a. The rounded bores 176a, 176b may have generally spherical profiles. In some embodiments, the first rounded bore 176a is formed by inserting a ball end mill through a bottom end of the aerator housing portion 170 and into the first chamber 172 until the ball end mill engages and removes material from the dividing wall 175. Likewise, the second rounded bore 176b is formed by inserting the ball end mill through the bottom end of the aerator housing and into the second chamber 174 until the ball end mill engages and removes material from the dividing wall 175 opposite the first rounded bore 176a. Machining the transfer passage 176 in this manner advantageously allows for the transfer passage 176 to be formed without requiring any additional access openings, which would be required to drill transversely through the dividing wall 175 using a straight drill bit, for example. In addition, the rounded bores 176a, 176b lack sharp corners and 90-degree interface angles, which inhibits product from becoming lodged in the transfer passage 176 and thereby facilitates cleaning. In some embodiments, the transfer passage 176 (including the rounded bores 176a, 176b) may be formed in other ways, including but not limited to injection-molding or 3D printing.

With continued reference to FIG. 9, a first mixing rod 178 is supported within the first chamber 172, and a second mixing rod 180 is supported within the second chamber 174. In the illustrated embodiment, the first and second mixing rods 178, 180 are stationary labyrinth mixing rods, each having a plurality of grooves and/or teeth to define a tortuous flow pathway along the exterior of the mixing rods 178, 180. In other embodiments, one or more mixing rods of other types or geometries may be used. In the illustrated embodiment, each of the mixing rods 178, 180 is made of plastic; however, the mixing rods 178, 180 may be made from other materials in other embodiments.

With reference to FIG. 6, each of the mixing rods 178, 180 in the illustrated embodiment includes an annular groove 191 that receives a retaining pin assembly 192 to couple the mixing rods 178, 180 to the housing 52. To remove the mixing rods 178, 180 (e.g., for cleaning or replacement), the retaining pin assembly 192 may be withdrawn from the housing 52, and the mixing rods 178, 180 may then be pushed down and out of their respective chambers 172, 174 from the top side of the housing 52. In other embodiments, the mixing rods 178, 180 may be removably coupled to the housing 52 in other ways. For example, in some embodiments, the mixing rods 178, 180 may include threads, cam profiles, or the like, allowing the mixing rods 178, 180 to be inserted and removed from the bottom end of the aerator housing portion 170.

In use, the drive unit 14 drives the pump assembly 146, which forces an air and product mixture through the discharge passage 158 and into the first chamber 172 of the housing portion 170. The air and product mixture then flows along the first mixing rod 178 in a first direction (i.e. the direction of arrow A as shown in FIG. 9), which partially aerates the product. Upon reaching the end of the first mixing rod 178, the partially aerated product flows through the transfer passage 176 in a second direction. In the illustrated embodiment, the second direction is generally transverse to the first direction. The partially aerated product then flows in a third direction (i.e. in the direction of arrow B), which is generally opposite the first direction, and over the second mixing rod 180. This completes aeration of the product, and the aerated or whipped product is discharged from the second chamber 174 through the dispensing nozzle 22.

By providing two mixing rods 178, 180 in separate sections, the overall height of the aerator 142 is reduced, which in turn allows the overall size of the dispensing unit 18 to be minimized. In addition, the manufacturing tolerances for the mixing rods 178, 180 may be reduced, since the relatively shorter length of each rod 178, 180 (compared to a single-piece rod having a length equal to the combined lengths of the rods 178, 180) produces less tolerance stack-up. In other embodiments, however, the aerator 142 may include other mixing rod configurations, including a single-piece mixing rod, or any other number of mixing rods.

During operation, shearing of the product mixture that takes place as the product mixture flows over the mixing rods 178, 180 produces heat. Because the mixing rods 178, 180 are made of a material with low thermal conductivity (e.g., plastic in the illustrated embodiment), a minimal amount of heat is absorbed by the mixing rods 178, 180.

Rather, the generated heat is carried away with the product. In the illustrated embodiment, the mixing rods 178, 180 have a thermal conductivity between 0.1 and 0.5 Watts/Meter-Kelvin. In contrast, a conventional mixing rod, which is typically made of metal such as stainless steel, may have a thermal conductivity between 10 and 20 Watts/Meter-Kelvin or more. Thus, a conventional mixing rod may have a thermal conductivity at least 50 to 100 times greater than the mixing rods 178, 180, resulting in more heat being absorbed by the mixing rod. The low thermal conductivity of the mixing rods 178, 180 in the illustrated embodiment is particularly advantageous when the housing portion 170 is submerged within product contained within the product reservoir 20, such that heating of the product within the product reservoir 20 is minimized.

FIG. 8 illustrates a dispensing system 300 according to an embodiment of the present disclosure. The dispensing system 300 includes a drive unit 14 and a plurality of interchangeable dispensing units 18. By including a plurality of interchangeable dispensing units 18, the illustrated dispensing system 300 allows a user to couple dispensing units 18 containing different products (e.g., a dairy-based product, a soy-based product, an almond-milk based product, an oat-milk based product, etc.) to the drive unit 14 to quickly change the type of product to be dispensed. Because all of the product-contacting components are part of the interchangeable dispensing unit 18, no disassembly or cleaning is required when changing products.

Various features and aspects of the present invention are set forth in the following claims.

What is claimed is:

1. A food product dispenser comprising:
a drive unit;
a dispensing unit removably coupled to the drive unit, the dispensing unit including
a product reservoir configured to store the food product,
a dispensing nozzle; and
a product transfer assembly including
a pump assembly configured to be driven by the drive unit when the dispensing unit is coupled to the drive unit to convey the food product from the product reservoir to the dispensing nozzle, and
an aerator upstream of the dispensing nozzle,
wherein the pump assembly is configured to convey the food product along the aerator to aerate the food product before the food product is discharged from the dispensing nozzle.

2. The food product dispenser of claim 1, wherein the pump assembly includes a rotor shaft, wherein the drive unit includes a drive shaft, and wherein the drive shaft is drivably coupled to the rotor shaft when the dispensing unit is coupled to the drive unit.

3. The food product dispenser of claim 2, wherein the drive shaft is decoupled from the rotor shaft when the dispensing unit is decoupled from the drive unit.

4. The food product dispenser of claim 1, wherein the product reservoir includes an insulated container.

5. The food product dispenser of claim 1, wherein the product transfer assembly includes a housing removably coupled to the product reservoir.

6. The food product dispenser of claim 1, wherein the aerator extends into the product reservoir.

7. The food product dispenser of claim 6, wherein the aerator includes a stationary mixing rod.

8. The food product dispenser of claim 7, wherein the stationary mixing rod is made of plastic.

9. A food product dispenser comprising:
a drive unit;
a dispensing unit removably coupled to the drive unit, the dispensing unit including
a product reservoir configured to store the food product,
a dispensing nozzle; and
a product transfer assembly including
a housing removably coupled to the product reservoir,
a pump assembly configured to be driven by the drive unit when the dispensing unit is coupled to the drive unit to convey the food product from the product reservoir to the dispensing nozzle, and
an aerator upstream of the dispensing nozzle,
wherein the pump assembly is configured to convey the food product along the aerator to aerate the food product before the food product is discharged from the dispensing nozzle,
wherein the housing includes an aerator housing portion having a first chamber and a second chamber, and
wherein the aerator includes a first stationary mixing rod supported within the first chamber and a second stationary mixing rod supported within the second chamber.

10. The food product dispenser of claim 9, wherein the aerator housing portion includes a transfer passage interconnecting the first chamber and the second chamber.

11. The food product dispenser of claim 10, wherein the transfer passage includes a first rounded bore and a second rounded bore intersecting the first rounded bore.

12. The food product dispenser of claim 10, wherein the food product is configured to flow over the first stationary mixing rod in a first direction and over the second stationary mixing rod in a second direction opposite the first direction.

13. A food product dispenser comprising:
a drive unit;
a dispensing unit removably coupled to the drive unit, the dispensing unit including
a product reservoir configured to store the food product,
a dispensing nozzle, and
a product transfer assembly configured to be driven by the drive unit when the dispensing unit is coupled to the drive unit to convey the food product from the product reservoir to the dispensing nozzle,
wherein the product transfer assembly includes a stationary mixing rod upstream of the dispensing nozzle to aerate the food product before the food product is discharged from the dispensing nozzle.

14. The food product dispenser of claim 13, wherein the product reservoir includes an insulated container, and wherein the product transfer assembly includes a housing removably coupled to the product reservoir.

15. The food product dispenser of claim 14, wherein the stationary mixing rod is a first stationary mixing rod, wherein the product transfer assembly further includes a second stationary mixing rod positioned fluidly between the first stationary mixing rod and the dispensing nozzle, and wherein the housing includes an aerator housing portion having a first chamber in which the first stationary mixing rod is received and a second chamber in which the second stationary mixing rod is received.

16. The food product dispenser of claim 15, wherein the aerator housing portion extends into the product reservoir.

17. The food product dispenser of claim 16, wherein the first and second stationary mixing rods are made of plastic.

18. The food product dispenser of claim 15, wherein the first chamber and the second chamber are separated by a dividing wall, and wherein a transfer passage extends through the dividing wall to interconnect the first chamber and the second chamber.

19. The food product dispenser of claim 1, wherein the dispensing unit is one of a plurality of interchangeable dispensing units, each removably couplable to the drive unit.

20. The food product dispenser of claim 9, wherein the dispensing unit is one of a plurality of interchangeable dispensing units, each removably couplable to the drive unit.

21. The food product dispenser of claim 13, wherein the dispensing unit is one of a plurality of interchangeable dispensing units, each removably couplable to the drive unit.

* * * * *